United States Patent [19]

Chou

[11] Patent Number: 4,915,793

[45] Date of Patent: Apr. 10, 1990

[54] WATER TREATMENT APPARATUS

[76] Inventor: Tien-Fu Chou, 37-5, Kuo Pei Lane, Feng Shan City, Kaohsiung, Hsien, Taiwan

[21] Appl. No.: 255,012

[22] Filed: Oct. 7, 1988

[51] Int. Cl.$^4$ ............................................. B01D 3/04
[52] U.S. Cl. ............................ 202/202; 159/27.1; 202/160; 202/176; 202/180; 202/237; 202/254; 203/2; 203/10; 203/22; 203/100; 203/DIG. 8
[58] Field of Search ............... 203/10, 2, 22, 110, 203/DIG. 8, 1; 202/237, 176, 190, 202, 181, 254, 180, 160; 159/27.1; 122/332

[56] References Cited

U.S. PATENT DOCUMENTS

| | | | |
|---|---|---|---|
| 669,966 | 3/1901 | Rose | 202/189 |
| 3,055,810 | 9/1962 | Skow | 203/10 |
| 3,635,799 | 1/1972 | Lowi, Jr. | 203/10 |
| 3,696,003 | 10/1972 | Fitch et al. | 202/180 |
| 3,825,491 | 7/1974 | Sanchez | 203/10 |
| 4,081,331 | 3/1978 | Weiss | 202/83 |
| 4,687,550 | 8/1987 | Wong | 203/10 |
| 4,818,344 | 4/1989 | Glucksman | 202/83 |

OTHER PUBLICATIONS

Waterwise Inc., "Atlantis Water Distiller", Ultra Still, Center Hill, Fla.

Primary Examiner—Virginia Manoharan
Attorney, Agent, or Firm—Ladas & Parry

[57] ABSTRACT

A potable water dispenser includes a first reservoir for storing raw water, a second reservoir for storing boiled hot water, and a third reservoir for storing boiled warm water. The second reservoir is surrounded by the raw water in the first reservoir so as to effect a heat exchange therebetween. A condenser is disposed on the top end of the second reservoir. A heating device is interposed between the first and second reservoirs so as to vaporize the raw water from the first reservoir. Then, the vapor flows into the condenser so as to form boiled hot water which falls into the second reservoir. The boiled hot water will flow from the second reserovir into the third reservoir through a water duct so as to form boiled warm water. Two water tap units are respectively communicated with the second and third reservoirs so as to supply hot and warm water.

6 Claims, 4 Drawing Sheets

WATER TREATMENT APPARATUS

BACKGROUND OF THE INVENTITON

This invention relates to a water treatment apparatus, more particularly to a highly efficient water treatment apparatus whereby the provision of boiled water is assured.

The improvement of this invention is directed to a conventional water treatment apparatus shown in FIG. 1. As illustrated, the water treatment apparatus 7 includes a raw water reservoir 70, a casing 71, a raw water duct 711, a high-temperature boiled water reservoir 712, a low-temperature boiled water reservoir 713 and a boiled water duct 714. The raw water in the raw water reservoir 70 naturally flows into the high-temperature boiled water reservoir 712 through the raw water duct 711. The raw water in the high-temperature boiled water reservoir 712 is boiled by the heating element H and flows into the low-temperature boiled water reservoir 713 through the boiled water duct 714 along which the boiled hot water from the high-temperature boiled water reservoir 712 is somewhat cooled. Therefore, boiled warm or cold water can be formed in the low-temperature boiled water reservoir 713. The boiled water in the high-temperature boiled water reservoir 712 is maintained at a desired temperature by means of a thermostat TS. A first water tap unit 7120 may be opened to supply boiled hot water from the high-temperature boiled water reservoir 712, while a second water tap unit 7130 may be opened to supply boiled warm or cold water from the low-temperature boiled water reservoir 713. This water treatment apparatus 7 suffers from the following disadvantages:

(1) A portion of unboiled or raw water in the high-temperature boiled water reservoir 712 often flows into the low-temperature boiled water reservoir 713 prior to its being boiled. Accordingly, unboiled water may be supplied from the second water tap unit 7130.

(2) Unboiled water may be also supplied from the first water tap unit 7120.

(3) Because no heat exchanging device is provided in the water treatment apparatus 7, the efficiency of the water treatment apparatus 7 is unsatisfactory.

SUMMARY OF THE INVENTION

The main object of this invention is therefore to provide a water treatment apparatus which can assuredly boil and supply water.

Another object of this invention is therefore to provide a highly efficient water treatment apparatus with a heat exchanger.

According to this invention, a water treatment apparatus includes a first reservoir for storing raw water, and a second reservoir for storing boiled water. The second reservoir is disposed within the first reservoir and surrounded by the raw water in the first reservoir so as to effect a heat exchange between the raw water in the first reservoir and the boiled water in the second reservoir. A condenser is disposed in the first reservoir above the second reservoir and is communicated with the second reservoir at the lower end thereof. A heat-resistant pipe is communicated with the lower end of the first reservoir so that the raw water in the first reservoir can naturally flow into the pipe. A first heating device is connected to the pipe so as to vaporize the water in the pipe. A vapor duct intercommunicates the pipe and the condenser so that the vapor in the pipe can rise in the vapor duct, thereby flowing into the condenser. A third reservoir is disposed outside the first reservoir below the second reservoir for purpose of storing the boiled water that has been cooled. A water so that the water in the third reservoir is cooler than the water in the second reservoir duct intercommunicates the lower end of the second reservoir and the third reservoir so that the boiled water in the second reservoir can naturally flow ino the third reservoir through the water duct in which the boiled water from the second reservoir is somewhat cooled in order to form cooled water in the third reservoir. A first water tap unit is communicated with the second reservoir for regulating and guiding the boiled water stored in the second reservoir to the outside of the second reservoir. A second water tap unit is communicated with the third reservoir for regulating and guiding the cooled water stored in the third reservoir to the outside of the third reservoir.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
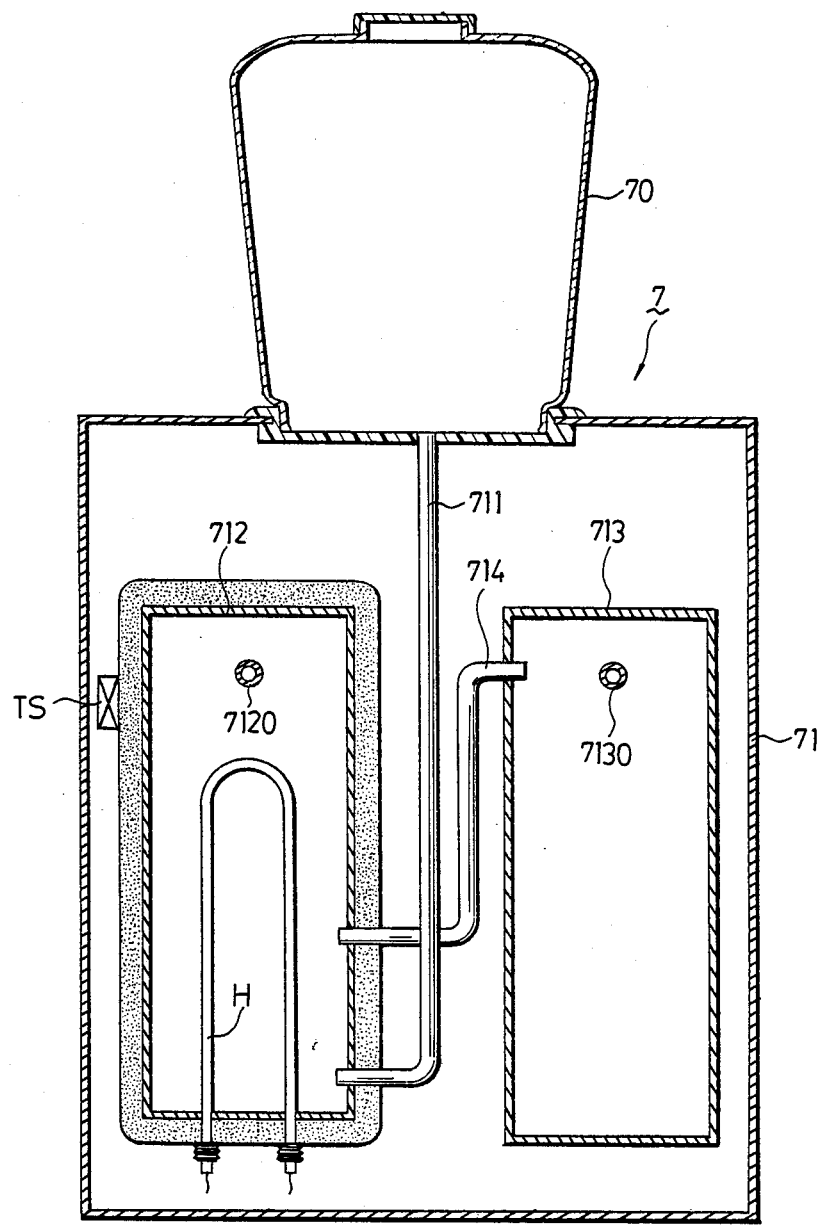
FIG. 1 is a schematic view of a conventional water treatment apparatus.
Figure 2:
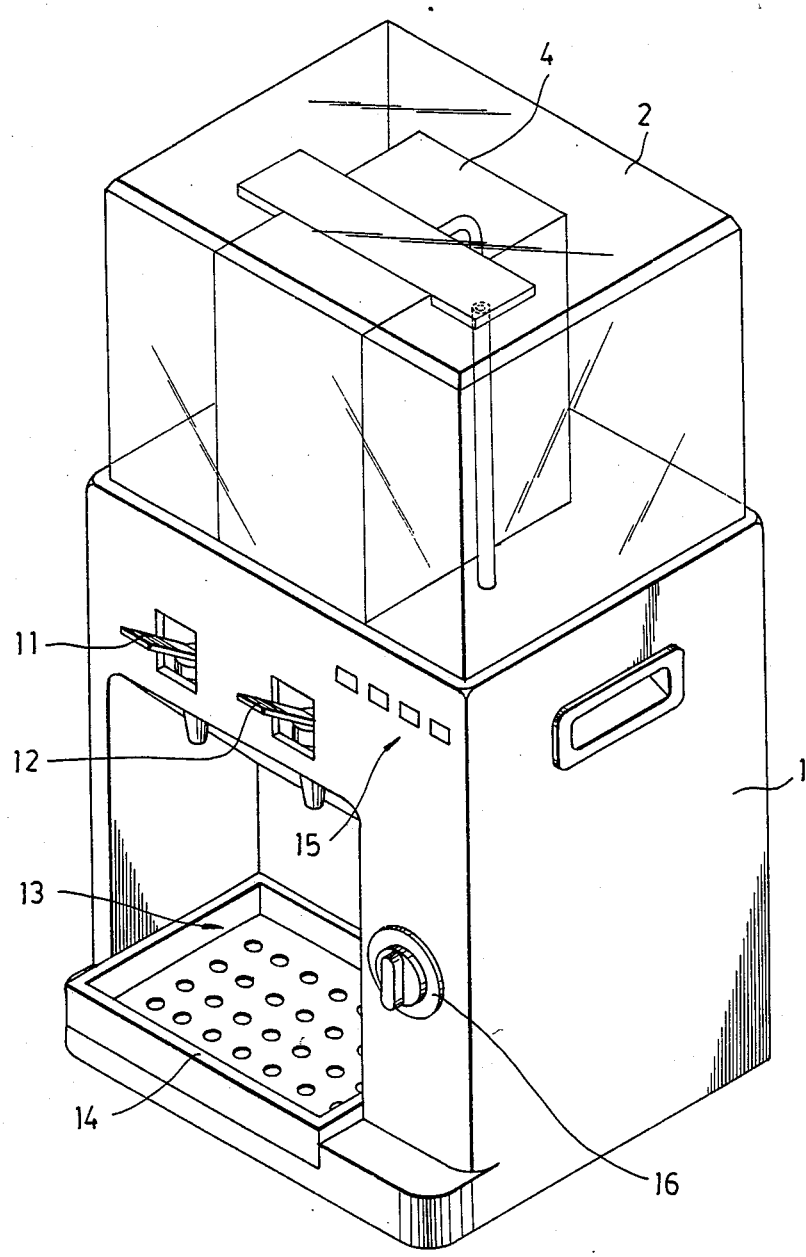
FIG. 2 is a perspective view of a water treatment apparatus according to this invention.
Figure 3:
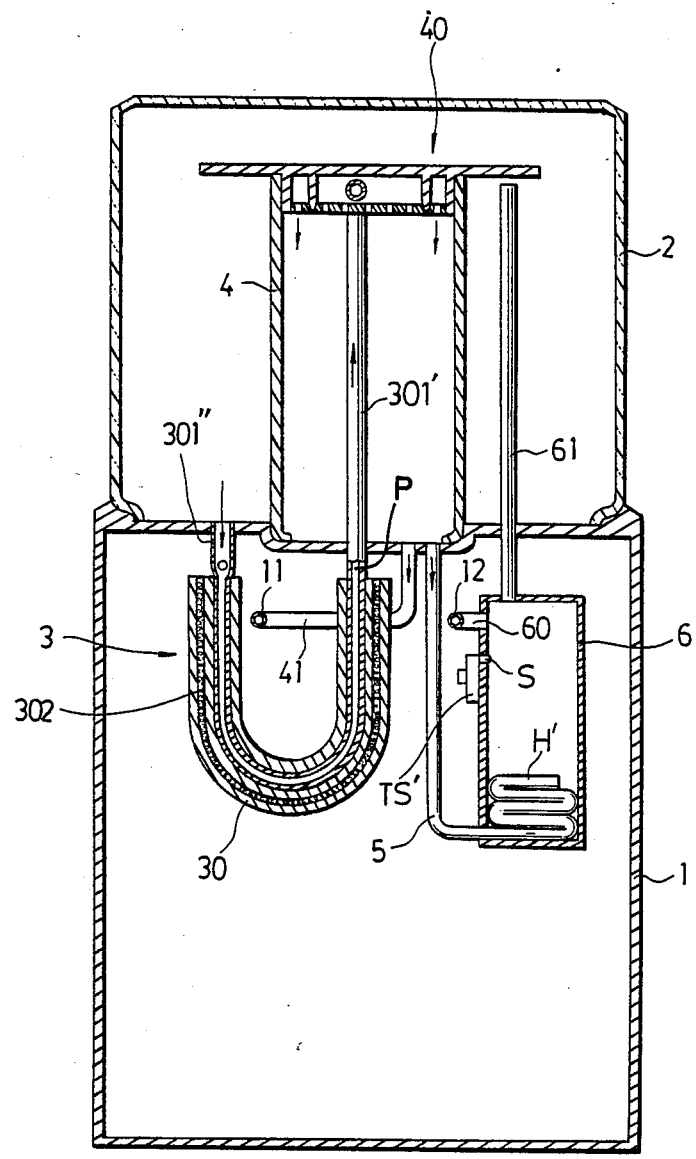
FIG. 3 is a schematic view showing the water treatment apparatus of this invention.

Referring to FIGS. 2 and 3, a water treatment apparatus of this invention includes a casing 1, an openable first reservoir 2 for storing raw water, a heat-resistant U-shaped pipe P, a vapor duct 301', a first heating device 3, a second reservoir 4 for storing boiled water, a water duct 5, and a third reservoir 6 for storing boiled water than has been cooled. The second reservoir 4 is disposed in the first reservoir 2 and surrounded by the raw water in the first reservoir 2. The pipe P is communicated with the lower ends of the first reservoir 2 and vapor duct 301' so that the raw water in the first reservoir 2 can naturally flow into the pipe P. A reducer 301" interconnects the first reservoir 2 and the pipe P and has a large-diameter upper portion and a small-diameter lower portion so that raw water from the first reservoir 2 flows through the pipe P at a certain flow rate. The first heating device 3 includes a tubular heat conductor 30 sleeved on the pipe P, and a heating coil 302 embedded in the heat conductor 30 for supplying heat to the raw water, flowing through the pipe P, via the heat conductor 30.

Figure 4:
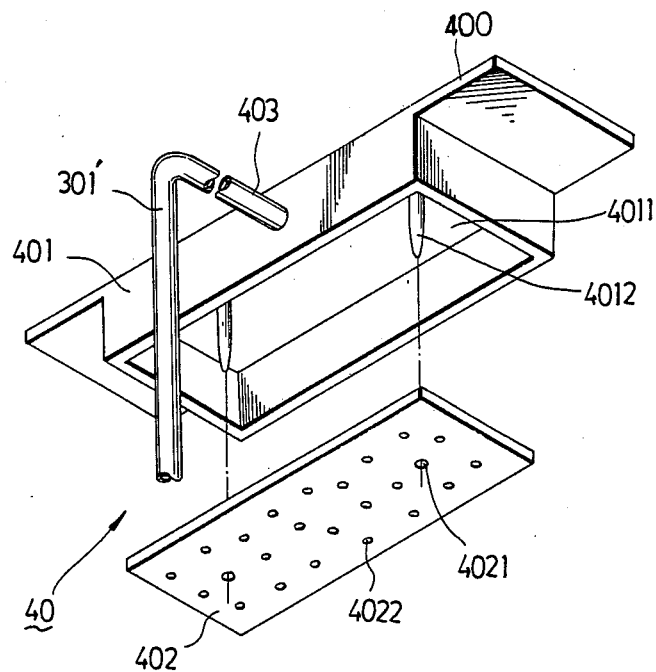
FIG. 4 is an exploded view showing the condenser of the water treatment apparatus according to this invention.

The raw water from the first reservoir 2 is vaporized in the pipe P by means of the first heating device 3 and rises into the condenser 40. The open top end of the second reservoir 4 is shielded by the condenser 40. Referring to FIG. 4, the condenser 40 includes a plate-like upper end portion 400 from which a looped wall portion 401 extends downward. The looped wall portion 401 is inserted into the second reservoir 4 so that the plate-like portion 400 is supported on the top end of the second reservoir 4. Two posts 4012 protrude downward from the plate-like portion 400, inside off the looped wall portion 401, and are inserted tightly into two large holes 4021 of a sieve tray 402. A plurality of small holes 4022 are also formed in the sieve tray 402 so that water condensed from the vapor, coming from the vapor duct 301', can flow downward therethrough. A chamber 4011 is defined by the platelike portion 400, the looped wall portion 401 and the sieve tray 402, and communicated with the vapor duct 301' by a duct 403 which is disposed outside of the second reservoir 4.

The water duct 5 connects the lower ends of the second reservoir 4 and the third reservoir 6. When the boiled water from the second reservoir 4 flows through the water duct 5, it is cooled and finally forms the cooled water in the third reservoir 6. A second heating device H' is installed in the lower end portion of the first reservoir 6 and elctrically connected to a thermostat TS' whereby the cooled water in the third reservoir 6 can be maintained at a desired temperature. The thermostat TS' is equipped with a sensor S. A pressure discharge pipe 61 extends from the inside of the third reservoir 6 to the inside of the first reservoir 2 so as to prevent explosion of the third reservoir 6.

A first water tap unit 11 is communicated with the second reservoir 4 through a duct 41 for regulating and guiding boiled water out of the second reservoir 4. Similarly, a second water tap unit 12 is communicated with the third reservoir 6 through a duct 60 for regulating and guiding cooled water out of the third reservoir 6. The casing 1 has a cavity 13 in which a porous tray 14 is positioned. A cup (not shown) may be placed onto the porous tray 14 under the first water tap unit 11 or the second water tap unit 12 in a known manner for collecting hot or warm water. A push-button type power switch unit 15 and a rotary-knob type time switch unit 16 are provided on the outer surface of the casing 1.

The water treatment apparatus of this invention has the following advantages:

(1) Because the water in the second reservoir 4 comes from the condenser 40 and is thus formed from the vapor in the vapor duct 301', all of the hot water in the second reservoir 4 has been boiled. Hence, all the water in the third reservoir 6 is boiled water that has been cooled.

(2) Because the second reservoir 4 is surrounded by the raw water in the first reservoir 2, raw water charged into the first reservoir 2 preheated by the boiled water in the second reservoir 4. In the meantime, the boiled water in the second reservoir 4 is somewhat cooled by the raw water in the first reservoir 2. A heat exchange is therefore achieved between the boiled water in the second reservoir 4 and the raw water in the first reservoir 2, thereby increasing the efficiency of the water treatment apparatus.

With this invention thus explained, it is apparent that numerous modifications and variations can be made without departing from the scope and spirit of this invention. It is therefore intended that this invention be limited only as indicated in the appended claims.

I claim:

1. A water treatment apparatus comprising:

a first reservoir for storing raw water;

a second reservoir for storing water at a first temperature, said second reservoir being disposed in said first reservoir and surrounded by raw water in said first reservoir so as to effect a heat exchange between raw water in said first reservoir and water in said second reservoir;

a condenser, disposed in said first reservoir above said second reservoir, having a lower end which is in fluid communication with said second reservoir;

a heat resistant pipe connected with a lower end of said first reservoir so that raw water in said first reservoir naturally flows into said pipe;

a first heating device connected to said pipe for vaporizing raw water in said pipe;

a vapor duct connecting said pipe and said condenser so that vapor in said pipe rises in said vapor duct, thereby flowing into said condenser;

a third reservoir for storing water at a second temperature, the water at the second temperature being cooler than the water at the first temperature, said third reservoir being disposed outside said first reservoir adjacent said second reservoir;

a water duct connecting a lower end of said second reservoir and said third reservoir so that water in said second reservoir naturally flows into said third reservoir through said waterduct in which water from said second reservoir is cooled to form the cooler water in said third reservoir;

a first water tap unit connected with said second reservoir for regulating and guiding water stored in said second reservoir to outside of said second reservoir; and a second tap unit connected with said third reservoir for regulating and guiding water stored in said third reservoir to outside of said third reservoir.

2. The water treatment apparatus as claimed in claim 1, wherein said third reservoir includes a second heating device installed in a lower end portion thereof, and a thermostat electrically connected to said second heating device for maintaining the water in said third reservoir at the second temperature.

3. The water treatment apparatus as claimed in claim 2, wherein said third reservoir includes a pressure discharge tube extending from inside of said third reservoir to inside of said first reservoir.

4. The water treatment apparatus as claimed in claim 1, wherein a reducer connects said pipe and said first reservoir, said reducer having a large-diameter portion connected with said first reservoir, and a small-diameter portion connected with said pipe, whereby, raw water flows into said pipe at a predetermined flow rate.

5. The water treatment apparatus as claimed in claim 1, wherein said first heating device includes a tubular heat conductor sleeved on said pipe, and a heating coil embedded in said heat conductor for vaporizing water flowing through said pipe.

6. The water treatment apparatus as claimed in claim 1, wherein said second reservoir has an open top end which is shielded by said condenser, said condenser including an upper end portion supported by said open top end of said second reservoir, a looped wall portion protruding downward from a bottom surface of said upper end portion and inserted into said second reservoir, and a sieve tray having a plurality of holes formed therethrough and fastened to a lower end of said looped wall so that a chamber is defined by said upper end portion, said looped wall portion and said sieve tray, said chamber being connected with said vapor duct, whereby, vapor from said vapor duct is condensed in said condenser and flows into said second reservoir via said holes of said seive tray.

* * * * *